(12) United States Patent
Marappan et al.

(10) Patent No.: US 11,226,851 B1
(45) Date of Patent: Jan. 18, 2022

(54) EXECUTION OF MULTIPATH OPERATION TRIGGERED BY CONTAINER APPLICATION

(71) Applicant: EMC IP Holding Company LLC, Hopkinton, MA (US)

(72) Inventors: Gopinath Marappan, Coimbatore (IN); Maneesh Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/925,543

(22) Filed: Jul. 10, 2020

(51) Int. Cl.
*G06F 9/54* (2006.01)
*G06F 13/10* (2006.01)
*G06F 16/17* (2019.01)
*G06F 16/13* (2019.01)

(52) U.S. Cl.
CPC ............ *G06F 9/542* (2013.01); *G06F 13/102* (2013.01); *G06F 16/13* (2019.01); *G06F 16/1734* (2019.01)

(58) Field of Classification Search
None
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Syed A Roni
(74) *Attorney, Agent, or Firm* — Ryan, Mason & Lewis, LLP (57) ABSTRACT

A host device comprises a kernel space comprising a multipath driver component and a user space comprising a container comprising an application, a daemon process and a data structure comprising a plurality of file system entries. The multipath driver component comprises a handler that is configured to detect changes to the file system entries. The host device is configured to mount the data structure to the container and the file system entries are modifiable by the application via the mounting. The multipath driver component is configured to determine that a given file system entry has been modified based at least in part on a detection of a change by the handler and to issue an event to the daemon process. The daemon process is configured to execute an operation associated with the multipath driver in the user space based at least in part on the issued event.

20 Claims, 4 Drawing Sheets

(56) References Cited

U.S. PATENT DOCUMENTS

| | | |
|---|---|---|
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

EXECUTION OF MULTIPATH OPERATION TRIGGERED BY CONTAINER APPLICATION

FIELD

The field relates generally to information processing systems, and more particularly to storage in information processing systems.

BACKGROUND

Storage arrays and other types of storage systems are often shared by multiple host devices over a network. A host device may comprise a multipath input-output (MPIO) driver that is configured to process input-output (IO) operations for delivery from the host device to the storage system. Applications are often required to run inside docker containers on the host device in order to provide isolation from the host device system resources which are hosting the containers. The applications issue IO operations and the MPIO driver processes the IO operations for delivery to the storage system.

SUMMARY

In one embodiment, an apparatus comprises a host device comprising a processor coupled to a memory. The host device comprises a kernel space comprising a multipath driver component of a multipath driver. The multipath driver is configured to deliver input-output operations that are issued by an application from the host device to a storage system over a network. The host device further comprises a user space comprising a container comprising the application, a daemon process that is configured to execute operations in the user space based at least in part on events issued by the multipath driver component in the kernel space and a data structure comprising a plurality of file system entries. The multipath driver component comprises a handler in the kernel space that is configured to detect changes to the file system entries in the data structure. The host device is configured to mount the data structure to the container. The file system entries in the data structure are modifiable by the application via the mounting. The multipath driver component is configured to determine that a given file system entry of the data structure has been modified by the application in the container via the mounting based at least in part on a detection of a change to the given file system entry by the handler and to issue an event that is configured for processing by the daemon process in the user space based at least in part on the determination that the given file system entry has been modified. The daemon process is configured to determine that the event has been issued by the multipath driver component in the kernel space and to execute an operation associated with the multipath driver in the user space based at least in part on the issued event.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
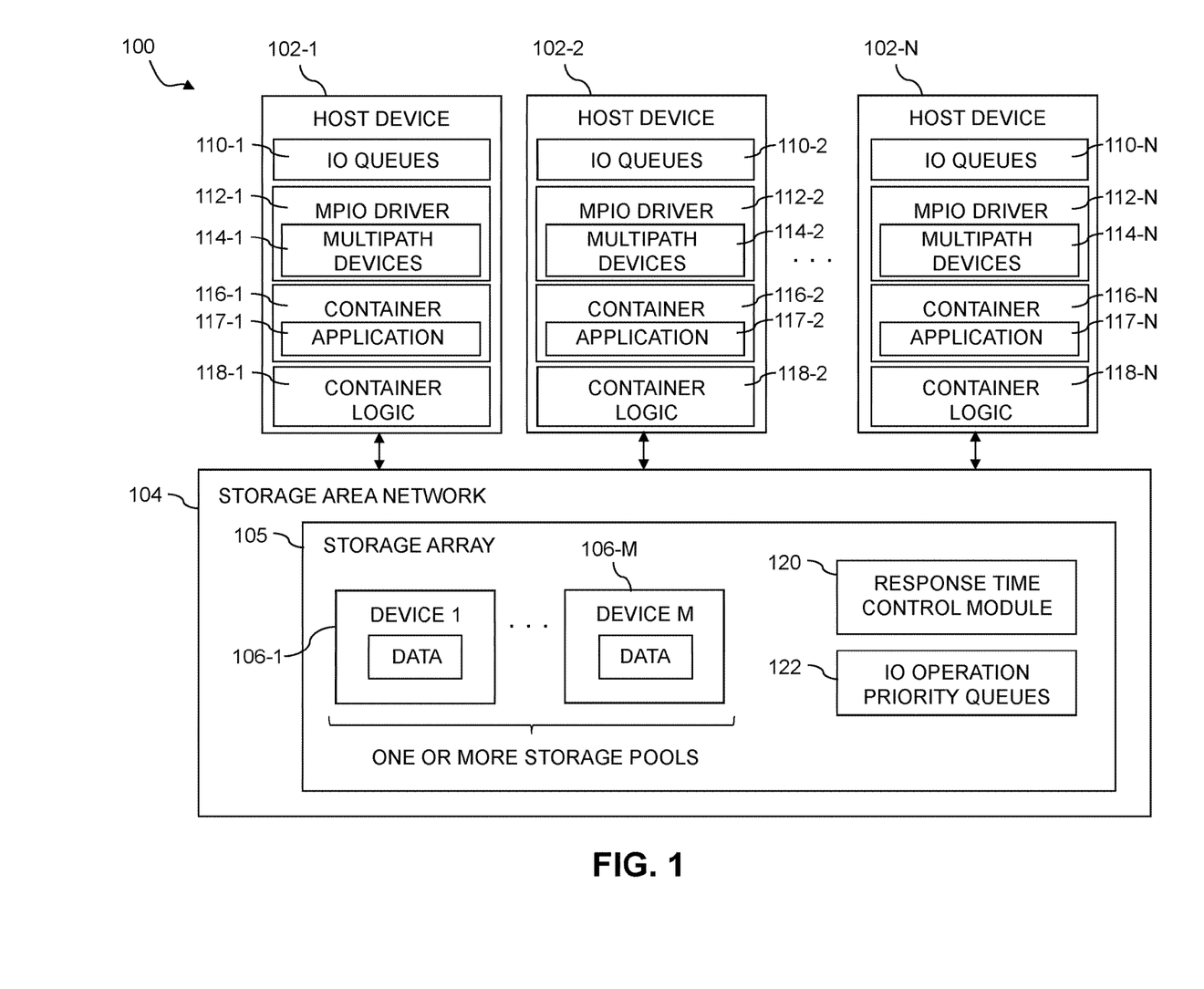
FIG. 1 is a block diagram of an information processing system configured with functionality for triggering execution of multipath operations in the user space by container applications via the kernel space in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a computer services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS)

model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given 10 operation as that term is broadly used herein illustratively comprises one or more such commands. References herein to terms such as "input-output" and "IO" should be understood to refer to input and/or output. Thus, an 10 operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple 10 paths to the storage array 105, with at least one of the storage devices 106 of the storage array 105 being visible to that host device on a given one of the paths. A given one of the storage devices 106 may be accessible to the given host device over multiple 10 paths.

Different ones of the storage devices 106 of the storage array 105 illustratively exhibit different latencies in processing of IO operations. In some cases, the same storage device may exhibit different latencies for different ones of multiple 10 paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N, respective MPIO drivers 112-1, 112-2, . . . 112-N, respective containers 116-1, 116-2, . . . 116-N and respective container logic 118-1, 118-2, . . . 118-N. The MPIO drivers 112 collectively comprise a multipath layer of the host devices 102 and are sometimes referred to herein as multipath drivers. In some embodiments, the container logic 118 is implemented at least in part by the MPIO drivers 112. In some embodiments, the container logic 118 is implemented in part by the MPIO drivers 112 and in part by other components of host devices 102.

The host devices 102 also comprise respective multipath devices 114-1, 114-2, . . . 114-N. Multipath devices 114 are logical devices that comprise information on one or more paths from a host device 102 to a corresponding logical volume such as, e.g., a LUN, of a storage device 106. The individual block devices representing each path are known as native devices. For example, the MPIO drivers 112 group the information on all paths, e.g., native devices, from a host device 102 to a corresponding logical volume into a multipath device 114 for that logical volume. An MPIO driver 112 routes received IO operations from the host device 102 to the corresponding logical volume according to the information found in the multipath device 114 corresponding to that logical volume. In some embodiments, a multipath device 114 may be included as part of a respective MPIO driver 112 of a host device 102. In some embodiments, the multipath device 114 may be implemented separately from an MPIO driver 112 of a host device 102 or may be implemented on a host device 102 that does not include an MPIO driver 112.

Applications 117-1, 117-2, . . . 117-N run in the containers 116 and utilize the multipath devices 114 for the submission of IO operations for distribution and delivery across the available paths to the storage array 105 by the MPIO driver 112. When paths fail, the MPIO driver 112 will typically redirect the IO operations to other alive paths in the multipath devices 114.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement functionality for triggering execution of multipath operations in the user space by container applications via the kernel space. Other types of MPIO drivers from other driver vendors may be suitably modified to incorporate functionality for triggering execution of multipath operations in the user space by container applications via the kernel space as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019 and is incorporated by reference herein in its entirety.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, containers 116, applications 117 and container logic 118 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

With reference to FIGS. 1-4, a host device 102 comprises a user space 210, a kernel space 220 and a hardware space 230, and communicates with the storage array 105 via SAN 104.

Figure 2:
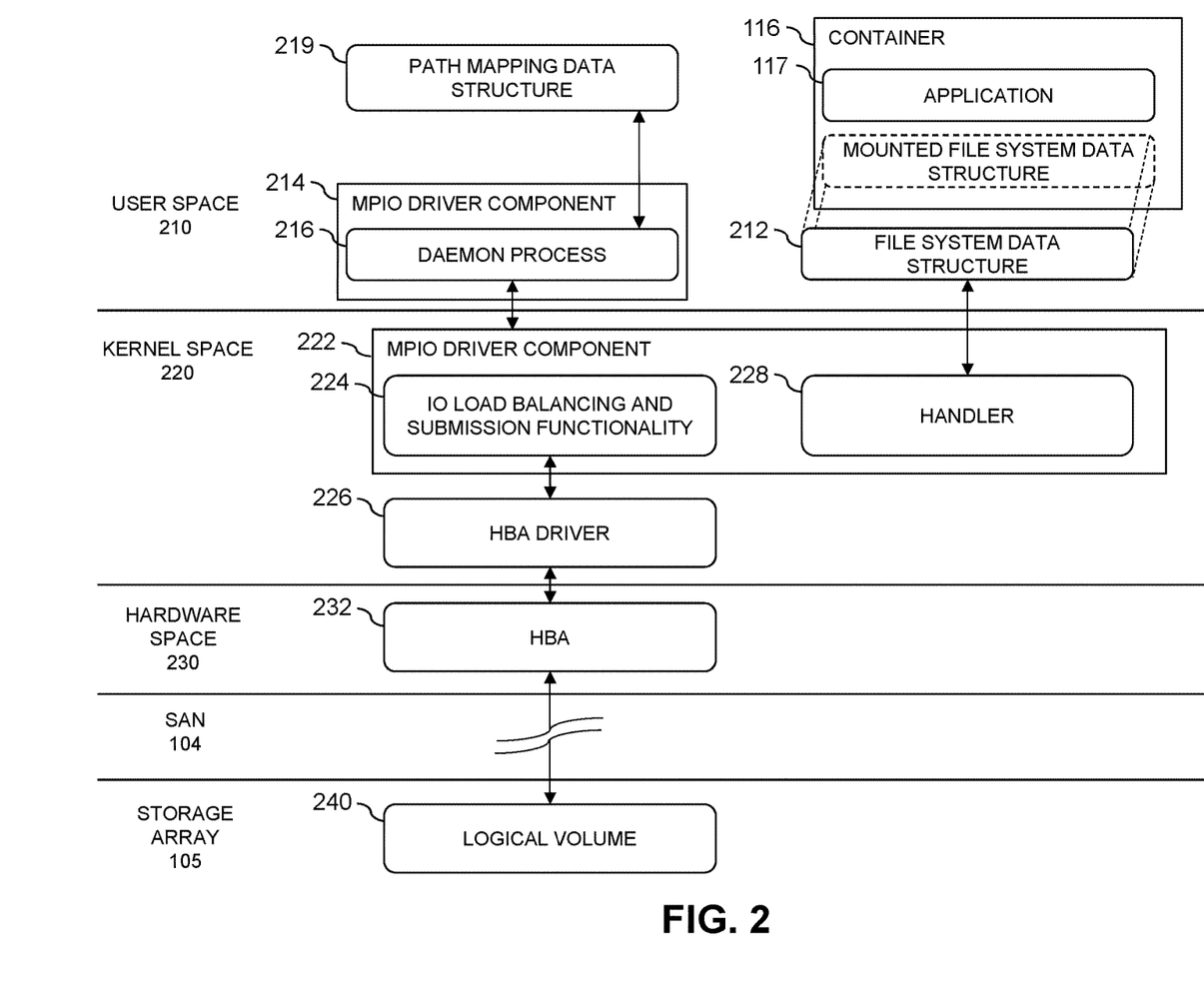
FIG. 2 is a diagram illustrating an example interaction path between a host device and a logical volume of a storage system in an illustrative embodiment.

The user space 210 comprises one or more containers 116, e.g., docker containers, a file system data structure 212, an MPIO driver component 214 which is a user space component of MPIO driver 112, and a path mapping data structure 219. The kernel space 220 comprises an MPIO driver component 222, which is a kernel space component of MPIO driver 112, and an HBA driver 226 which is configured to interface with an HBA 232 in the hardware space 230. HBA 232 is used by the HBA driver 226 to communicate with the storage array 105 via the SAN 104 to submit IO operations for a logical volume 240 of the storage array 105. The MPIO driver component 222 comprises IO load balancing and submission functionality 224 which is utilized by the MPIO driver to select on or more paths for the submission of IO operations to the storage array 105.

Containers 116 offer a logical packaging mechanism in which applications 117 can be abstracted from the environment in which they actually run. This decoupling allows container-based applications 117 to be deployed easily and consistently, regardless of whether the target environment is a private data center, the public cloud or even a personal computing device. A given container 116 comprises an application 117 which may submit IO operations for delivery to the storage array 105 by the MPIO driver 112.

As mentioned above, MPIO drivers 112 comprise multipathing software that is used to manage the usage and load balancing of the various paths to the logical volumes 240 of the storage array 105. An MPIO driver 112 generates a multipath device 114 for each logical volume 240 managed by the MPIO driver 112 and provides the multipath device 114 for use by the host device 102 or applications 117 under an assigned pseudo name. The mapping between the pseudo name associated with a multipath device 114 and the corresponding logical volume 240 is maintained in the path mapping data structure 219 in the user space 210. Any time a logical volume 240 is added to or removed from the storage array 105, the path mapping data structure 219 needs to be updated so that the mapping is consistent even if the host device 102 is subsequently rebooted.

The MPIO driver component 214 comprises a daemon process 216 that is configured to execute user space operations associated with the MPIO driver 112. The daemon process 216 is a user space process associated with the MPIO driver 112 that communicates with the MPIO driver component 222 in the kernel space and performs a variety of monitoring and reporting functions. The daemon process 216 utilizes a hanging message, e.g., a hanging input-output control (IOCTL) message, that is sent to the kernel space MPIO driver component 222. The hanging message stays open and pending at the MPIO driver component 222 until the MPIO driver component 222 replies with a response. The MPIO driver component 222 typically sends a response to the hanging message only when it needs some job to be performed in the user space by the daemon process 216. For example, if the MPIO driver component 222 in the kernel detects that new logical volumes 240 are added to the storage array 105, it may inform the daemon process 216 to trigger a bus rescan and to execute a command to make the corresponding multipath devices 214 available and then complete their configuration in the MPIO driver 112. Once a response to the hanging message is received by the daemon process 216 from the MPIO driver component 222, the daemon process 216 sends another hanging message to the MPIO driver component 222 to await an additional response.

Figure 3:
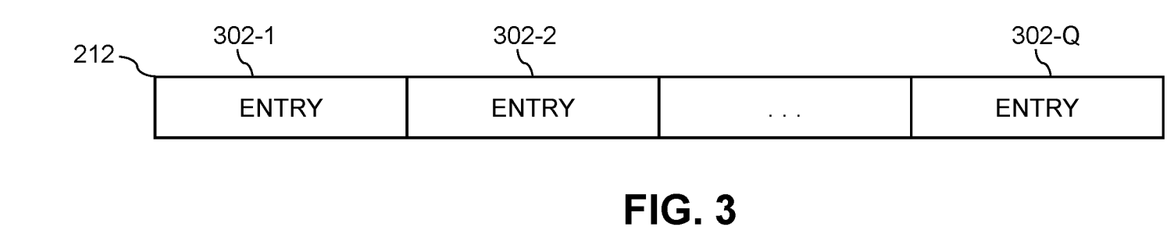
FIG. 3 is a diagram of an example file system data structure in an illustrative embodiment.

The file system data structure 212 comprises a kernel-based in-memory file system such as, e.g., a process file system (procfs), system file system (sysfs) or another similar data structure. In some embodiments, the file system data structure 212 is implemented such that it only exists while the host device 102 is powered on and active. The file system data structure 212 comprises an interface that is provided by the operating system of the host device 102 for use as a medium for user level processes to interact with the kernel. In a typical host device 102, the file system data structure 212 is only available to the operating system of the host device 102 but not to applications 117 running in the container 116. The file system data structure 212 comprises entries 302-1, 302-2, . . . 302-Q which may be written to in a similar manner to a file of the host device 102. Typically, a callback routine is associated with each entry 302 that gets called when any data is changed or added to the entry 302. The callback routine indicates to the MPIO driver component 222 that something has been changed or added. For example, a flag associated with each entry 302 may invoke a kernel function such as handler 228 of the MPIO driver component 222 of the MPIO driver 112 when set which may then indicate to the MPIO driver component 222 that an entry has been modified and cause the MPIO driver component 222 to trigger an event that corresponds to that entry.

Figure 4:
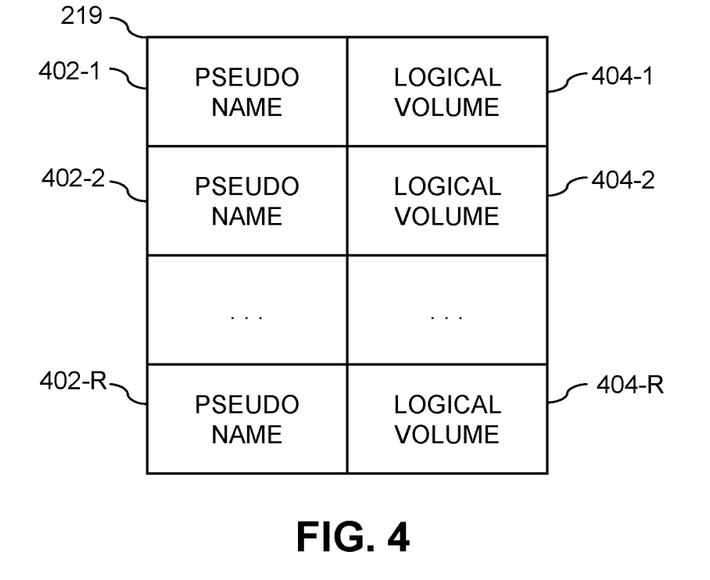
FIG. 4 is a diagram of an example path mapping data structure in an illustrative embodiment.

The application 117 runs inside the container 116 to provide a layer of isolation between the application functionality and the functionality of the host device 102. Such containerized applications gain access to the resources of the host device 102 through the use of namespace pseudo names such as, e.g., SCSI namespace pseudo names such as sda, sdb, . . . sdx, or pseudo names assigned to the multipath devices 114 by an installed MPIO driver 112. The correspondence between the namespace pseudo names assigned to the multipath devices 114 and the corresponding logical volumes 240 is stored in respective entries 402-1, 402-2, . . . 402-R and 404-1, 404-2, . . . 404-R of the path mapping data structure 219 in the user space 210. For example, an entry 402-1 may comprise a pseudo name assigned to a multipath device 114 and an entry 404-1 may comprise an indication of the corresponding logical volume 240 of the storage array 105 to which the pseudo name is mapped. The operating system of the host device 102 such as, e.g., Linux, often supports dynamic changes to its multipath devices 114, e.g., add, remove and modification operations, which may require a rescan of the underlying layers such as, e.g., the SCSI layer, to determine what logical volumes 240 have changed and to update the entries 402 and 404 in the path mapping data structure 219 accordingly. For example, a MPIO driver 112 may invoke a utility program that performs check, configure and release operations which makes sure that the latest changes are reflected by correspondence between namespace pseudo names and logical volumes 240 found in the entries 402 and 404 of the path mapping data structure 219.

Some MPIO drivers 112 comprise components that run in the user space 210 of the host device 102, whether physical or VM, but do not run inside the containers 116 residing in the user space 210 of that host device 102. The containerized applications 117 typically need to periodically communicate with the storage array 105 to provision new logical volumes 240 or remove old logical volumes 240 as the need arises. For example, when old logical volumes 240 are removed from the storage array 105, all the paths to those removed logical volumes 240 become "dead" or otherwise unavailable for use by the MPIO driver 112. The pseudo name to logical volume mapping for the multipath device 114 comprising these unavailable paths is typically not removed automatically from the path mapping data structure 219, and the corresponding pseudo names assigned to the multipath devices 114 for the unavailable paths are not available for use by multipath devices 114 associated with new logical volumes 240.

To complete a logical volume removal operation, two steps often need to be performed. A check force operation which removes the dead or unavailable paths and a release operation which releases the pseudo name used by the multipath device 114 corresponding to the removed logical volume 240, e.g., by removing the mapping between the pseudo name and the corresponding logical volume 240 from the path mapping data structure 219.

However, an application 117 running inside a container 116 typically cannot issue commands to perform such check force and release operations. This is because the utility tool for executing these operations is available only in the user space 210 of the host device 102, but not in the container 116. In addition, even if the utility tool and its associated libraries are copied to the container 116, the character device that is needed for the user space processes to communicate with the MPIO driver 112 is not accessible due to the isolation of the application 117 by the container 116. There is also the potential issue of whether or not the operating system of the container 116 is different from the operating system of the host device 102 which may inhibit the application 117 from executing the utility tool operations and from using the associated libraries even if they were copied into the container 116.

Even if the utility tool and the associated libraries are copied to the container 116, the operating system in the container 116 is the same as the operating system of the host device 102 and the character device is also exposed to the container 116 in some manner to allow access, the path mapping data structure 219 still resides in the user space 210 of the host device 102 and is therefore inaccessible to the application 117 in the container 116 due to the isolation of the application 117 by the container 116. Attempts to expose the path mapping data structure 219 to the container 116 provide a unique set of challenges due to the difficulties in performing locking of the path mapping data structure 219 between processes executing in the container 116 and processes executing in the host device 102 since the application 117 is isolated from the host device 102 by the container 116.

Maintaining a copy of the path mapping data structure 219 inside the container 116 may present other challenges since the container can be moved from one host device 102 to another which may require significant efforts to maintain a synchronization between the copy of the path mapping data structure in the container 116 and the path mapping data structure 219 in the user space 210 of whichever host device 102 the container 116 currently resides.

A communication mechanism such as, e.g., an Inter Process Communication protocol (IPC), a Secure Shell protocol (SSH) or a Hypertext Transfer Protocol (HTTP), may be used by the application 117 to access the host device 102 and execute these utility tools in the user space 210 of the host device 102 but such a communication mechanism also present challenges in both security and inefficiency since context switching is involved.

An application 117 running inside a container 116 often expects changes to the path mapping data structure 219 when the application 117 requests provisioning of new logical volumes 240 or the removal of logical volumes 240 by the storage array 105. In such a case, the application 117 may wish to issue a scan of the device tree by the host device 102 to update the path mapping data structure 219. As mentioned above, due to the isolation provided by the container 116, the application 117 is unable to trigger these operations directly in the user space 210 and instead must wait for the MPIO driver 112 to perform these operations on its own as part of its normal functionality, which may delay the availability of the new logical volumes 240 or the removal and reallocation of pseudo names from the multipath devices 114 associated with dead or unavailable logical volumes 240 to multipath devices 114 associated with new logical volumes 240.

The disclosed container logic 118 extends the MPIO driver 112 in such a way that it operates in a similar manner to native storage protocols such as, e.g., SCSI, and implements the MPIO driver 112 to container 116 interactions in a way that improves both docker compliance and efficiency. Container logic 118 is configured to provide a mechanism for the application 117 residing in the container 116 to provide an indication to the MPIO driver 112 that a rescanning of the available logical volumes 240 and multipath devices 114 and an updating of the path mapping data structure 219 needs to be performed. For example, when the application 117 issues commands to the storage array 105 to add or remove logical volumes 240, it will also be able to utilize the container logic 118 to provide an indication to the MPIO driver 112 that that a rescan is needed to update the path mapping data structure 219 so that system remains healthy and presents the latest multipath devices 114 for use by the application 117 and MPIO driver 112.

The MPIO driver 112 maintains entries in the file system data structure 212, e.g., a procfs or sysfs data structure of the host device 102, which may be utilized for basic functionalities such as changing logging levels or performing developer options. In illustrative embodiments, entries 302 of the file system data structure 212 are utilized by container logic 118 for triggering rescans and path mapping data structure updates by the application 117. In some cases, an entry is added, created or repurposed in the file system data structure 212 by the MPIO driver 112 for each operation that the application 117. In some cases, a particular entry 302 may correspond to a request to perform a rescan, check, release, remove, or any other operation by the MPIO driver 112. For example, in some embodiments, a separate entry 302 may correspond to each operation to be performed.

The container logic 118 is configured to mount the file system data structure 212 to the container 116 where the application 117 is running such that the application 117 can manipulate the entries 302 of the file system data structure 212 via the mounting. For example, the application 117 may set a value, e.g., a flag, in a given entry 302 that corresponds to a rescan via the mounting to indicate to the MPIO driver 112 that a rescan is requested by the application 117.

When the value is set for a given entry 302, the callback routine invokes the handler 228 of the MPIO driver component 222 which triggers the MPIO driver component 222 to issue an event as a response to the hanging message of the daemon process 216. For example, the event may comprise an instruction to the daemon process 216 to perform one or more operations in the user space 210 that correspond to the modified entry 302 such as, e.g., a rescan operation, a check force operation, a release operation or any other operation.

On receipt of such an event in response to the hanging message, the daemon process 216 executes the relevant multipath operation or operations in the user space. For example, in response to an event comprising an instruction to perform a rescan operation, the daemon process 216 may perform a check force operation followed by a release operation which effectively removes the multipath devices 114 comprising the dead or unavailable paths to a logical volume 240 that has been removed and releases the corresponding pseudo names associated with those multipath devices 114 in the path mapping data structure 219 for use with any new logical volumes 240 that may be allocated by the application 117.

While the rescan operation is described above, any other operation that needs to be performed in the user space 210 of the host device 102 by the application 117 may be triggered through the use of the above described container logic 118. In addition, while described above with reference to a handler 228 of an MPIO driver component 222 and daemon process 216 of an MPIO driver component 214, in some embodiments, handlers and daemon processes associated with other components of a host device 102 may be utilized where, for example, an application 117 may be configured to trigger any operation in the user space 210 of the host device 102 via the container logic 118 using those other handlers and daemon processes including those that are not associated with MPIO driver operations.

Illustrative embodiments of the techniques and functionality of container logic 118 will now be described in more detail with reference to the flow diagram of FIG. 5.

Figure 5:
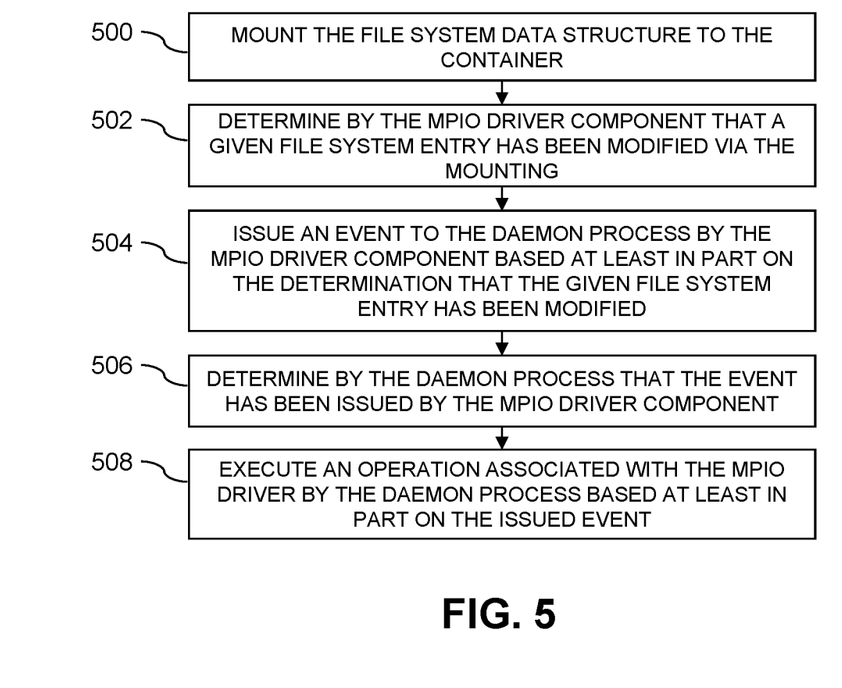
FIG. 5 is a flow diagram of an example process for triggering execution of multipath operations in the user space by container applications via the kernel space in an illustrative embodiment.

The process as shown in FIG. 5 includes steps 500 through 508, and is suitable for use in the system 100 but is more generally applicable to other types of systems comprising multiple host devices and a shared storage system.

While the example process of FIG. 5 is described below from the perspective a host device 102, any of the host devices 102-1, 102-2, . . . 102-N may be configured to perform one or more of the steps of the process of FIG. 5.

At step 500, container logic 118 mounts the file system data structure 212 to a container 116 of a host device 102.

At step 502, the MPIO driver component 222 in the kernel space 220 determines that a given file system entry 302 of the file system data structure 212 has been modified by the application 117 in the container 116 via the mounting based at least in part on a detection of a change to the given file system entry 302 by the handler 228, e.g., due to the callback routine for that entry.

At step 504, the MPIO driver component 222 issues an event that is configured for processing by the daemon process 216 in the user space 210 based at least in part on the determination that the given file system entry 302 has been modified. For example, the MPIO driver component 222 may issue the event as a response to a hanging message of the daemon process 216.

At step 506, the daemon process 216 determines that the event has been issued by the MPIO driver component 222 in the kernel space 220. For example, the daemon process 216 receives the event as a response to the hanging message. In some embodiments, the daemon process 216 may submit another hanging message to the MPIO driver component 222 to await additional responses.

At step 508, the daemon process 216 executes an operation associated with the MPIO driver 112 in the user space 210 based at least in part on the issued event, e.g., a rescan, force check, release or other operation.

Separate instances of the process of FIG. 5 may be performed in respective additional host devices that share the storage array.

The particular processing operations and other system functionality described in conjunction with the flow diagrams of FIG. 5 are presented by way of illustrative example only, and should not be construed as limiting the scope of the disclosure in any way. Alternative embodiments can use other types of processing operations involving host devices, storage systems and container logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different container logic arrangements within a given information processing system.

Functionality such as that described in conjunction with the flow diagram of FIG. 5 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for triggering execution of multipath operations in the user space by container applications via the kernel space are carried out at least in part under the control of its container logic 118. For example, container logic 118 is illustratively configured to control performance of portions of the process shown in the flow diagram described above in conjunction with FIG. 5.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for triggering execution of multipath operations in the user space by container applications via the kernel space. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support triggering execution of multipath operations in the user space by container applications via the kernel space.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent the use of the functionality for triggering execution of multipath operations in the user space by container applications via the kernel space as disclosed herein, container applications are unable to force a rescan and update of the available multipath devices and corresponding pseudo names and instead must wait until such a rescan occurs naturally as part of the MPIO functionality which may result in inefficient system usage and inhibits the availability of new logical volumes in a timely manner.

Such drawbacks are advantageously overcome in illustrative embodiments herein by utilization of container logic 118 to implement functionality for triggering execution of multipath operations in the user space by container applications via the kernel space as described above. For example, by mounting the file system data structure to the container, the application is enabled to modify entries in the files system data structure as a way of instructing the MPIO driver to trigger a rescan or other operation. The MPIO driver component in the kernel space then communicates with the daemon process in the user space to perform the operation and update the path mapping data structure. This allows the application, which may already be aware of changes to the logical volumes of the storage array due to the application requesting such changes, to force the rescan in conjunction with those changes which results in faster and more efficient updating of the path mapping data structure in response based on those changes.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the container logic 118 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, container logic and additional or alternative components. Also, the particular configurations of system and device elements and associated processing operations illustratively shown in the drawings can be varied in other embodiments. For example, a wide variety of different MPIO driver configurations and associated container logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  a host device comprising a processor coupled to a memory, the host device comprising:
    a kernel space comprising a multipath driver component of a multipath driver, the multipath driver being configured to deliver input-output operations that are issued by an application from the host device to a storage system over a network; and
    a user space comprising:
      a container comprising the application;
      a daemon process that is configured to execute operations in the user space based at least in part on events issued by the multipath driver component in the kernel space; and a data structure comprising a plurality of file system entries, the multipath driver component comprising a handler in the kernel space that is configured to detect changes to the file system entries in the data structure;

wherein the host device is configured to mount the data structure to the container, the file system entries in the data structure being modifiable by the application via the mounting, wherein a modified file system entry is associated with a flag set by the application; and wherein the multipath driver component is configured:
to determine that a given file system entry of the data structure has been modified by the application in the container via the mounting based at least in part on a detection of a change to the given file system entry by the handler; and
to issue an event that is configured for processing by the daemon process in the user space based at least in part on the determination that the given file system entry has been modified; and wherein the daemon process is configured:
to determine that the event has been issued by the multipath driver component in the kernel space; and
to execute an operation associated with the multipath driver in the user space based at least in part on the issued event.

2. The apparatus of claim 1 wherein the multipath driver is configured to create the given file system entry in the data structure based at least in part on the operation associated with the multipath driver.

3. The apparatus of claim 1 wherein:
the daemon process is configured to generate a hanging message and to submit the hanging message to the multipath driver component, the hanging message being configured to await a response from the multipath driver component;
issuing the event comprises the multipath driver component responding to the hanging message; and
determining that the event has been issued comprises obtaining the response to the hanging message by the daemon process.

4. The apparatus of claim 1 wherein:
the operation comprises a first operation associated with the multipath driver;
the given file system entry corresponds to the first operation;
a second file system entry of the plurality of file system entries corresponds to a second operation associated with the multipath driver that is different than the first operation;
the multipath driver component is further configured:
to determine that the second file system entry of the data structure has been modified by the application in the container via the mounting based at least in part on a detection of a change to the second file system entry by the handler; and
to issue a second event that is configured for processing by the daemon process in the user space based at least in part on the determination that the second file system entry has been modified; and wherein the daemon process is configured:
to determine that the second event has been issued by the multipath driver component in the kernel space; and
to execute the second operation in the user space based at least in part on the issued second event.

5. The apparatus of claim 4 wherein:
the user space further comprises a path mapping data structure that comprises mappings between device pseudo names and indications of paths to corresponding logical volumes of the storage system;
the multipath driver is configured to utilize the mappings to select one or more of the corresponding paths for delivering input-output operations to the logical volumes of the storage system;
the first operation comprises removing the indication corresponding a given path from the path data structure, the given path corresponding to a logical volume of the storage system that is no longer available; and
the second operation comprises releasing a device pseudo name corresponding to the removed indication such that the device pseudo name is available for mapping to another indication.

6. The apparatus of claim 1 wherein determining that the given file system entry of the data structure has been modified by the application in the container via the mounting comprises determining that the flag has been set in the given file system entry by the application.

7. The apparatus of claim 6 wherein determining that the flag has been set in the given file system entry by the application comprises receiving an indication that the flag has been set from a callback routine associated with the given entry, the callback routine being configured to trigger a submission of the indication to the handler based at least in part on the given entry being modified by the application.

8. A method comprising:
mounting a data structure to a container of a host device, the host device comprising:
a kernel space comprising a multipath driver component of a multipath driver, the multipath driver being configured to deliver input-output operations that are issued by an application from the host device to a storage system over a network; and
a user space comprising:
the container, the container comprising the application;
a daemon process that is configured to execute operations in the user space based at least in part on events issued by the multipath driver component in the kernel space; and
the data structure, the data structure comprising a plurality of file system entries, the multipath driver component comprising a handler in the kernel space that is configured to detect changes to the file system entries in the data structure, the file system entries in the data structure being modifiable by the application via the mounting, wherein a modified file system entry is associated with a flag set by the application;
determining, by the multipath driver component, that a given file system entry of the data structure has been modified by the application in the container via the mounting based at least in part on a detection of a change to the given file system entry by the handler;
issuing, by the multipath driver component, an event that is configured for processing by the daemon process in the user space based at least in part on the determination that the given file system entry has been modified;
determining, by the daemon process, that the event has been issued by the multipath driver component in the kernel space; and executing, by the daemon process, an operation associated with the multipath driver in the user space based at least in part on the issued event;

wherein the host device comprises a processor coupled to a memory.

9. The method of claim 8 wherein the multipath driver is configured to create the given file system entry in the data structure based at least in part on the operation associated with the multipath driver.

10. The method of claim 8 wherein:

the daemon process is configured to generate a hanging message and to submit the hanging message to the multipath driver component, the hanging message being configured to await a response from the multipath driver component;

issuing the event comprises the multipath driver component responding to the hanging message; and determining that the event has been issued comprises obtaining the response to the hanging message by the daemon process.

11. The method of claim 8 wherein:

the operation comprises a first operation associated with the multipath driver;

the given file system entry corresponds to the first operation;

a second file system entry of the plurality of file system entries corresponds to a second operation associated with the multipath driver that is different than the first operation; and the method further comprises:

determining, by the multipath driver component, that the second file system entry of the data structure has been modified by the application in the container via the mounting based at least in part on a detection of a change to the second file system entry by the handler;

issuing, by the multipath driver component, a second event that is configured for processing by the daemon process in the user space based at least in part on the determination that the second file system entry has been modified;

determining, by the daemon process, that the second event has been issued by the multipath driver component in the kernel space; and executing, by the daemon process, the second operation in the user space based at least in part on the issued second event.

12. The method of claim 11 wherein:

the user space further comprises a path mapping data structure that comprises mappings between device pseudo names and indications of paths to corresponding logical volumes of the storage system;

the multipath driver is configured to utilize the mappings to select one or more of the corresponding paths for delivering input-output operations to the logical volumes of the storage system;

the first operation comprises removing the indication corresponding a given path from the path data structure, the given path corresponding to a logical volume of the storage system that is no longer available; and the second operation comprises releasing a device pseudo name corresponding to the removed indication such that the device pseudo name is available for mapping to another indication.

13. The method of claim 8 wherein determining that the given file system entry of the data structure has been modified by the application in the container via the mounting comprises determining that the flag has been set in the given file system entry by the application.

14. The method of claim 13 wherein determining that the flag has been set in the given file system entry by the application comprises receiving an indication that the flag has been set from a callback routine associated with the given entry, the callback routine being configured to trigger a submission of the indication to the handler based at least in part on the given entry being modified by the application.

15. A computer program product comprising a non-transitory processor-readable storage medium having stored therein program code of one or more software programs, the program code being configured for execution by a host device comprising a processor coupled to a memory, the host device comprising:

a kernel space comprising a multipath driver component of a multipath driver, the multipath driver being configured to deliver input-output operations that are issued by an application from the host device to a storage system over a network; and a user space comprising:

a container comprising the application;

a daemon process that is configured to execute operations in the user space based at least in part on events issued by the multipath driver component in the kernel space; and a data structure comprising a plurality of file system entries, the multipath driver component comprising a handler in the kernel space that is configured to detect changes to the file system entries in the data structure;

wherein the program code, when executed by the host device, causes the host device:

to mount the data structure to the container, the file system entries in the data structure being modifiable by the application via the mounting, wherein a modified file system entry is associated with a flag set by the application:

to cause the multipath driver component:

to determine that a given file system entry of the data structure has been modified by the application in the container via the mounting based at least in part on a detection of a change to the given file system entry by the handler; and to issue an event that is configured for processing by the daemon process in the user space based at least in part on the determination that the given file system entry has been modified; and to cause the daemon process:

to determine that the event has been issued by the multipath driver component in the kernel space; and to execute an operation associated with the multipath driver in the user space based at least in part on the issued event.

16. The computer program product of claim 15 wherein the multipath driver is configured to create the given file system entry in the data structure based at least in part on the operation associated with the multipath driver.

17. The computer program product of claim 15 wherein:

the daemon process is configured to generate a hanging message and to submit the hanging message to the multipath driver component, the hanging message being configured to await a response from the multipath driver component;

issuing the event comprises the multipath driver component responding to the hanging message; and determining that the event has been issued comprises obtaining the response to the hanging message by the daemon process.

18. The computer program product of claim 15 wherein:
the operation comprises a first operation associated with the multipath driver;
the given file system entry corresponds to the first operation;
a second file system entry of the plurality of file system entries corresponds to a second operation associated with the multipath driver that is different than the first operation;
the program code further causes the multipath driver component:
  to determine that the second file system entry of the data structure has been modified by the application in the container via the mounting based at least in part on a detection of a change to the second file system entry by the handler; and
  to issue a second event that is configured for processing by the daemon process in the user space based at least in part on the determination that the second file system entry has been modified; and
the program code further causes the daemon process:
  to determine that the second event has been issued by the multipath driver component in the kernel space; and
  to execute the second operation in the user space based at least in part on the issued second event.

19. The computer program product of claim 18 wherein:
the user space further comprises a path mapping data structure that comprises mappings between device pseudo names and indications of paths to corresponding logical volumes of the storage system;
the multipath driver is configured to utilize the mappings to select one or more of the corresponding paths for delivering input-output operations to the logical volumes of the storage system;
the first operation comprises removing the indication corresponding a given path from the path data structure, the given path corresponding to a logical volume of the storage system that is no longer available; and
the second operation comprises releasing a device pseudo name corresponding to the removed indication such that the device pseudo name is available for mapping to another indication.

20. The computer program product of claim 15 wherein:
determining that the given file system entry of the data structure has been modified by the application in the container via the mounting comprises determining that the flag has been set in the given file system entry by the application; and
determining that the flag has been set in the given file system entry by the application comprises receiving an indication that the flag has been set from a callback routine associated with the given entry, the callback routine being configured to trigger a submission of the indication to the handler based at least in part on the given entry being modified by the application.

* * * * *